No. 893,533. PATENTED JULY 14, 1908.
J. F. McELROY.
ELECTRIC LIGHTING SYSTEM.
APPLICATION FILED JULY 28, 1899.
5 SHEETS—SHEET 2.
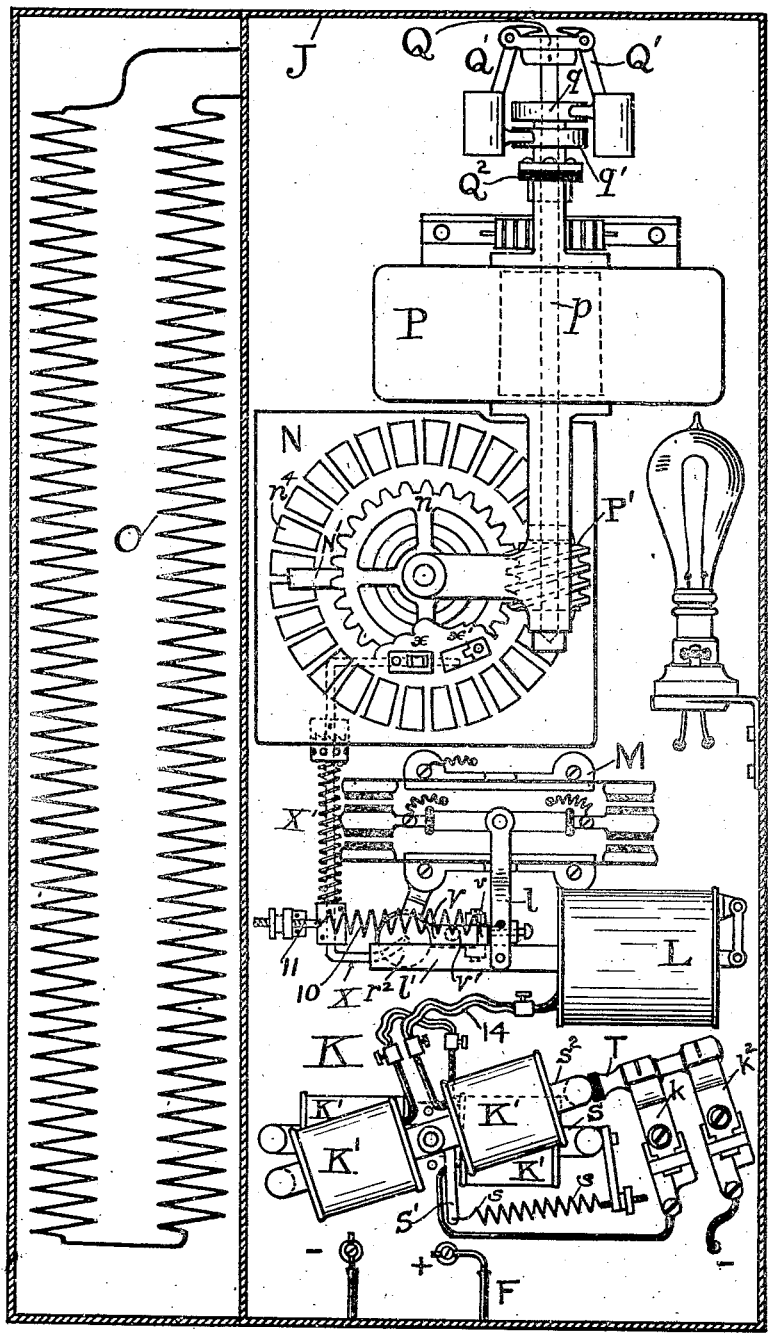
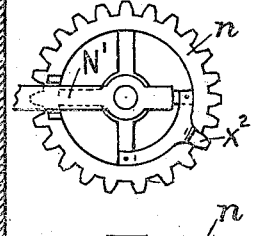
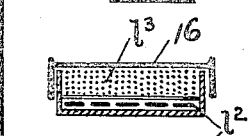
Witnesses
W. S. Morrison
A. V. A. McHarg
Inventor
James F. McElroy
by Ward & Cameron
Attys

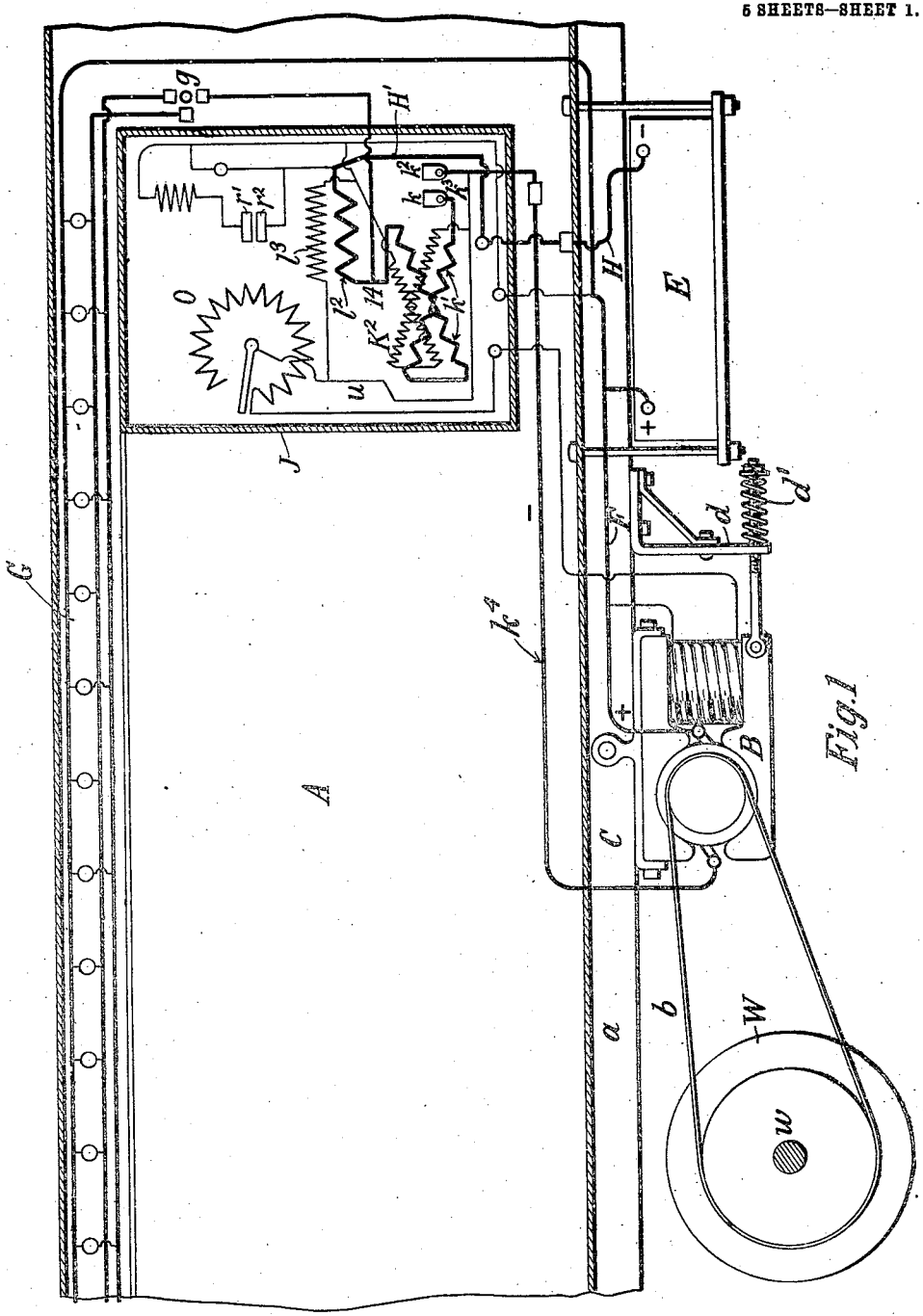

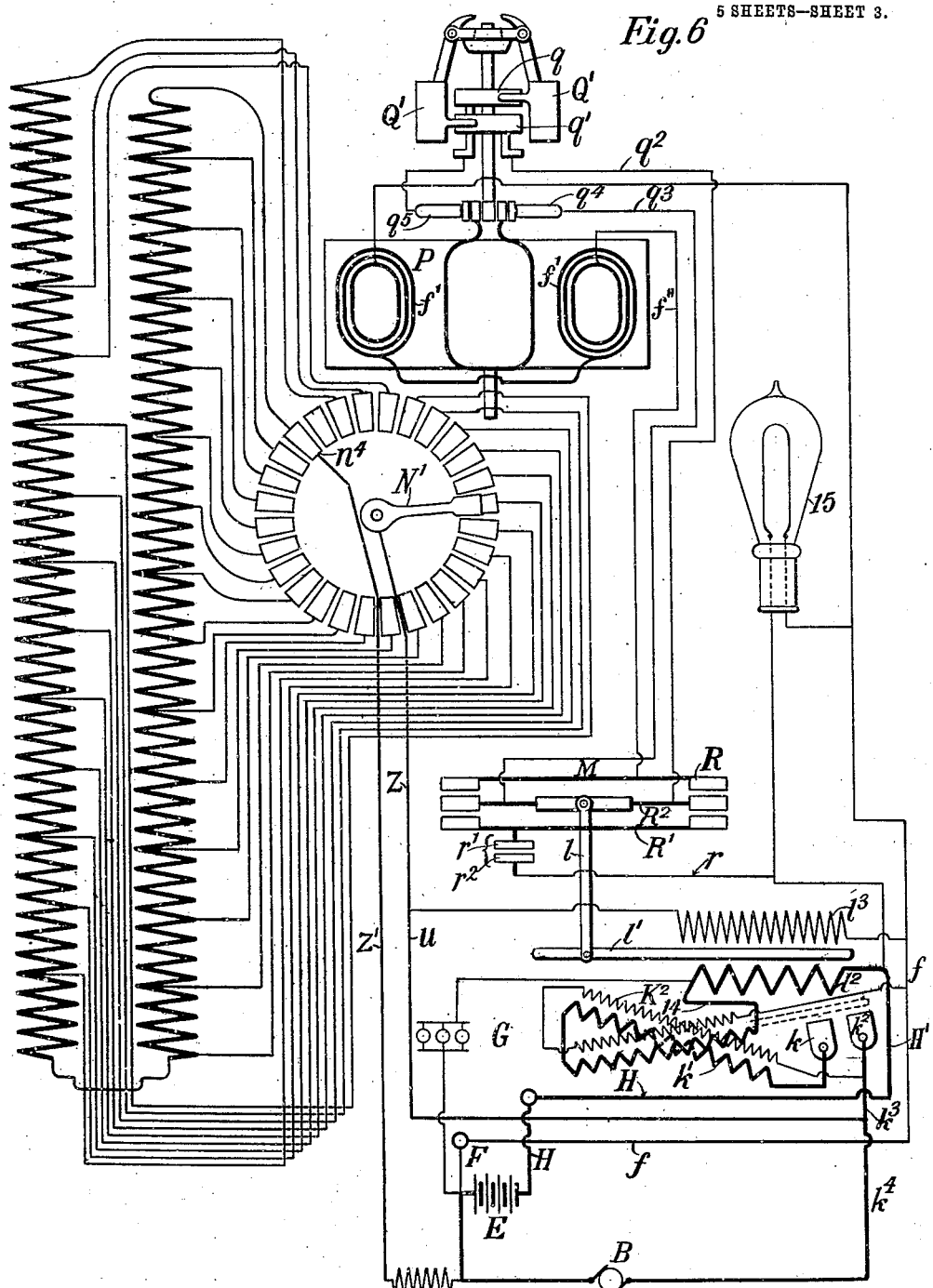

No. 893,533. PATENTED JULY 14, 1908.
J. F. McELROY.
ELECTRIC LIGHTING SYSTEM.
APPLICATION FILED JULY 28, 1899.

5 SHEETS—SHEET 4.

Witnesses
W. S. Morrison
A. V. A. McHarg

Inventor
James F. McElroy
by Ward & Cameron
Attys

No. 893,533. PATENTED JULY 14, 1908.
J. P. McELROY.
ELECTRIC LIGHTING SYSTEM.
APPLICATION FILED JULY 28, 1899.
5 SHEETS—SHEET 5.
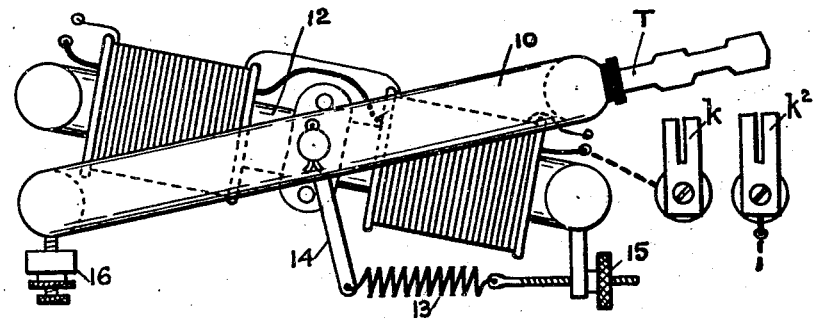
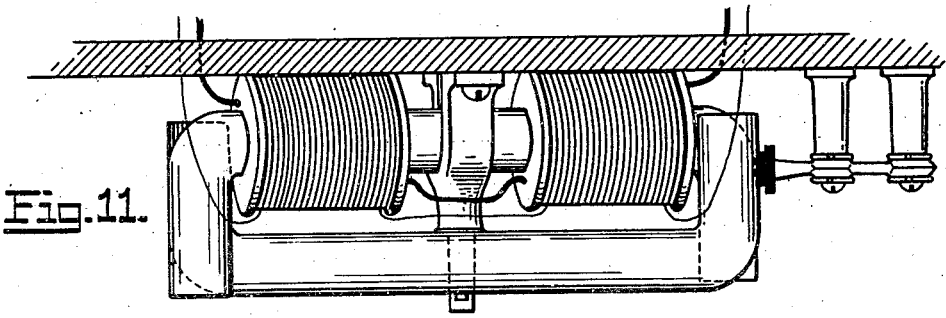
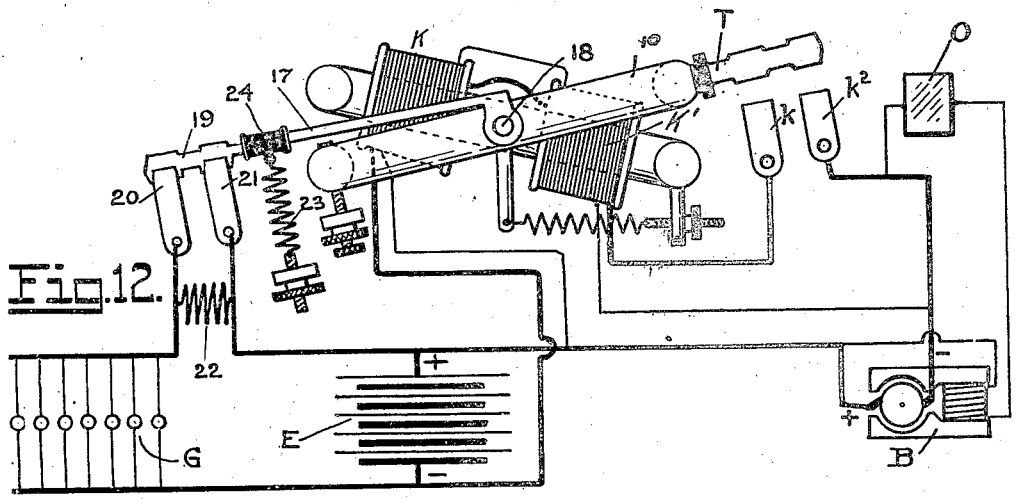
Witnesses
H. S. Morrison
A. V. A. McHarg
Inventor
James P. McElroy
by Ward & Cameron
Attys

UNITED STATES PATENT OFFICE.

JAMES F. McELROY, OF ALBANY, NEW YORK, ASSIGNOR TO CONSOLIDATED CAR HEATING COMPANY, A CORPORATION OF WEST VIRGINIA.

ELECTRIC-LIGHTING SYSTEM.

No. 893,533.         Specification of Letters Patent.         Patented July 14, 1908.

Application filed July 28, 1899. Serial No. 725,433.

*To all whom it may concern:*

Be it known that I, JAMES F. McELROY, a citizen of the United States of America, and resident of Albany, in the county of Albany and State of New York, have invented certain new and useful Improvements in Electric-Lighting Systems, of which the following is a specification.

My invention relates to systems of electric lighting wherein the generator is driven intermittently and at a rate of speed varying suddenly and rapidly over a wide range of speed. Such a system is useful for the lighting of railway vehicles by means of a dynamo driven from one of the axles. Certain features of it may also be used in similar situations, as for example, when the dynamo is driven by a windmill. I have devised an arrangement for maintaining the operation of the lamps in any desired numbers at all times and with a uniform illumination in spite of fluctuations in the driving power.

Figure 7:
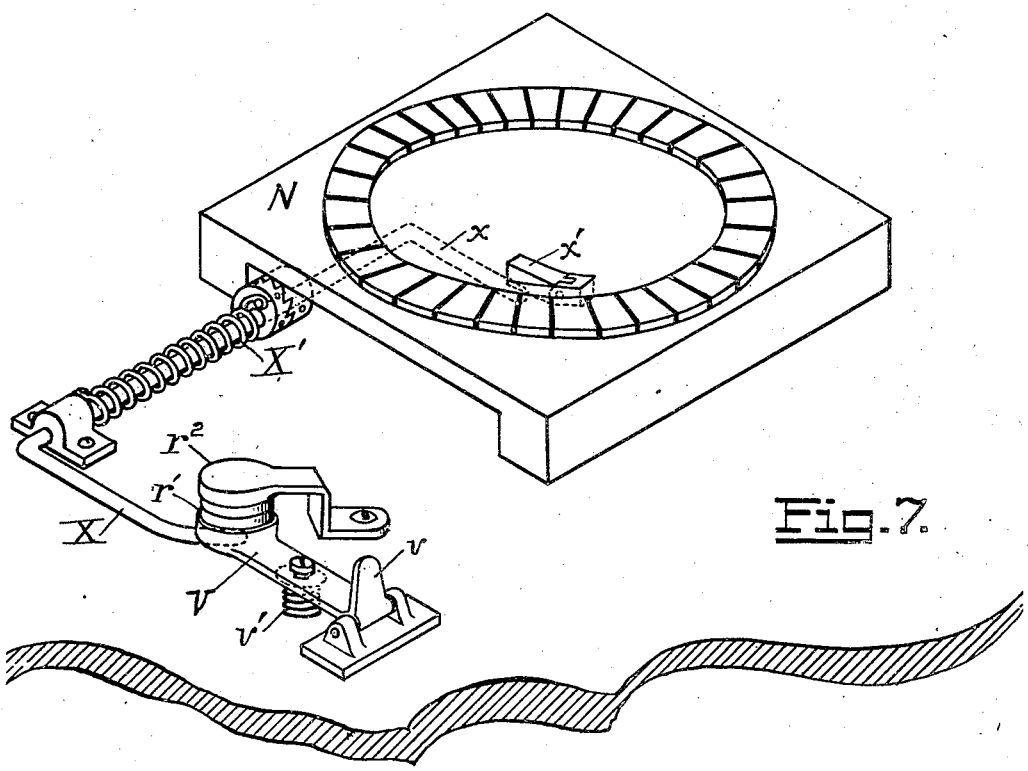
Figure 8:
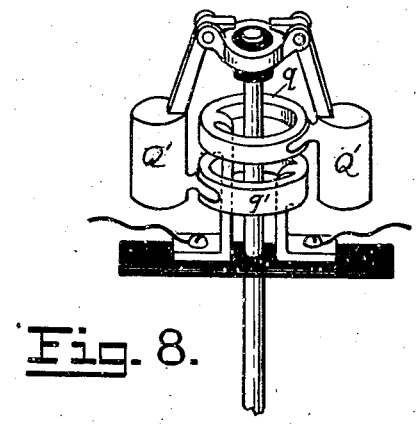
Figure 9:
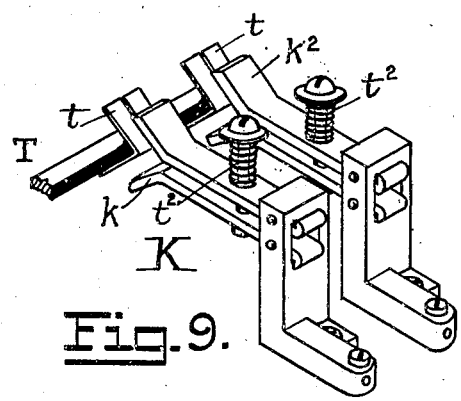

One of the forms which my invention may assume is illustrated in the accompanying drawings, in which Figure 1 is partly an elevation and partly a diagrammatic view of a railway vehicle lighted by my system; Fig. 2 is an elevation of the regulating device; Fig. 3 is a plan view of the rheostat wheel; Fig. 4 is an elevation of the rheostat wheel; Fig. 5 is a section of the potential magnet; Fig. 6 is a plan of wiring of the regulating device; Fig. 7 is a perspective detail view of the rheostat and its means of connection with the potential magnet; Fig. 8 is a detail view of the governor; Fig. 9 is a detail view of the switch connection with a part broken away; Fig. 10 is a detail view of a modified form of train switch; Fig. 11 is a plan view of the modified form shown in Fig. 10; Fig. 12 is an elevation of the modified form of train switch including apparatus for throwing in a rheostat between the lamp circuit and the dynamo when the lamp circuit is being supplied with current therefrom.

Similar letters refer to similar parts throughout the several views.

I provide in my system a dynamo, driven, for example, by an axle of a car or train, whose field magnet excitation is dependent only upon the potential or electro-motive force of the supply system. Heretofore it has been proposed to employ in similar situations a dynamo having its field magnet excitation dependent upon a variety of factors and not upon the potential only. Thus it has been proposed to employ a series dynamo or a compound dynamo in which the excitation is dependent upon the armature current. Such a machine is, however, impracticable for my purpose, since the speed variations tend to automatically change the excitation in the wrong direction, and if, for instance, the excitation is adequate for supplying a given load at one speed, it would become too great for that load at a higher speed or too small therefor at a lower speed. Such machines are also liable to become reversed. In other cases the excitation has been varied by a centrifugal governor, the speed being thus made the determining factor, but the machines do not respond quickly enough to make it feasible to secure constant potential by this means. I therefore employ a dynamo having the field magnet provided with but one exciting circuit, preferably a shunt circuit, and I regulate the excitation to provide at all times a constant potential on the main circuit, irrespective of the volume of current flowing therein, and I preserve such a constancy of potential in spite of the widest variations in speed and load. This I accomplish by employing a shunt magnet as the determining factor of regulation, and I add thereto means for adjusting the standard potential according to the condition of the storage battery, but such adjustment does not alter the essential character of my regulation which remains the same with respect to speed and load. This shunt or potential magnet I utilize to control the excitation of the dynamo field magnet by means of a director and a motor governed thereby, which in turn operates a rheostat in the field magnet circuit. The arrangement is such that the motor will be put into operation by any departure from the normal voltage, determined by the magnet, and will be maintained in action until it completely corrects such departure.

In a system heretofore employed by me, I have used the arrangement just as described, except the feature of adjusting the standard potential in accordance with the conditions of the storage battery, and such a feature constitutes one of the novel devices of the present invention.

In a system of the kind referred to it is necessary to provide a main line switch between the generator on the one hand and the lamps and battery on the other, and also to provide that this switch shall be automatically closed when the potential of the dynamo due to the speed imparted to it by the train—in distinction from the speed itself—shall reach a given value, and that it shall be automatically opened when the potentials of the battery and the dynamo shall reach a predetermined relative value, in order that the storage battery may be employed to operate the lamps without reversing the current through the generator whenever the generator stops by reason of the stoppage of the train, or whenever its potential for any reason falls below a certain value.

In the system I have heretofore employed I have provided a special potential magnet permanently connected to the main circuit on the dynamo side of the main line switch, which at a given potential should bring into action a second magnet on the main line switch that in turn should close such switch and connect the main line to the lamps and battery. In my present invention I do away with such special magnet and provide that the switch magnet itself shall be a potential magnet permanently connected to the main line on the dynamo side of the main line switch and serve to close that switch when the proper voltage is reached. Again, in my prior system aforesaid the potential magnet employed for regulating the dynamo was a simple shunt magnet connected to the main line circuit on the dynamo side of the main line switch, but in my present invention for the above mentioned purpose of adjusting the standard voltage with respect to certain storage-battery conditions, I supplement that coil by a coarse wire coil contained in the branch of the main circuit which leads to the storage battery so that the component of the main current which goes to the battery shall pass through this coil, which is wound so as to assist the shunt coil. By this means the potential will be maintained somewhat lower when the charging of the battery begins, and its counter electromotive force is small, but will be maintained somewhat higher when the battery is more fully charged and its counter electromotive force increased. Such modification of the voltage is not, however, sufficient to materially affect the operation of the lamps by the generator simultaneously with the charging of the battery. I have found this feature to be of great value in protecting the batteries when nearly or completely discharged against too great an influx of current, and I may thereby adjust by giving to the modifying coil the proper number of turns with respect to the various conditions, the rate of charging to the exact formula prescribed by the makers of the battery as the one to be followed if the best and the guaranteed results are to be had. That is to say, it is usual among battery makers to limit their guarantee thereof by the provision that the charging current shall not exceed a specified amount at the beginning of the charge and shall thereafter be reduced as the charge increases. These are the conditions required for the safety and proper working of the battery and unless complied with, its life and operation will not be guaranteed. It has been impossible with prior arrangements to thus graduate the charging current in a system of car lighting from the axle, but by the simple expedient above described I am enabled to effect such graduation and to secure thereby the important results of increased life in the battery, freedom from injury, better output and better action.

Another and important feature of my invention is a provision for enabling the motor which operates the rheostat in the field magnet circuit to be driven by the storage battery, in the event of a sudden stoppage of the dynamo which might leave the motor in some other than the "off" or zero position. To this end I connect the said motor to the main circuit on the battery side of the main line switch, so that the opening of said switch will not break the motor circuit. In addition, I provide that the motor shall break its own circuit when it reaches the zero rheostat position under the action of the storage battery, in order that the battery may not remain closed upon the motor and its charge thereby leak away. The motor circuit will, however, be automatically closed again when the dynamo starts into action once more.

I also provide in my present invention an arrangement for preventing the "racing" and "hunting" of the rheostat motor, which has heretofore been an objectionable feature. For this purpose I have provided the motor with a centrifugal governor which will open its circuit when a certain speed is exceeded.

Still another feature of my present invention which may be used to advantage in some cases, is an arrangement for differentiating the potential which the dynamo applies to the battery with respect to that which it simultaneously applies to the lamps, this differential being removed when the batteries are discharging and operating the lamps. To this end I connect the dynamo to the line by a potential switch set to act at the full potential required for charging the battery, which is higher than that required for operating the lamps, but I automatically insert a resistance between the dynamo and the lamps, so that the dynamo supplies the battery directly with the full potential, for example, seventy volts, but supplies the lamps with a potential, which is reduced by the resistance to, for example, sixty volts. When, however, the main line switch is open to disconnect the dynamo, this resistance is automatically short circuited, so that the battery current can pass directly to the lamps without going through the resistance, and may so operate the lamps at the normal pressure of sixty volts, which is the same pressure that was applied to them by the dynamo.

I preferably connect the dynamo with the axle of a vehicle, and arrange it beneath the same. I do not, however, limit myself to this arrangement. The dynamo may be within the vehicle or in any other convenient location.

It will also be observed that in my system the lamps are to be operated directly from the dynamo to a large extent, and that the storage battery is only employed to operate the lamps when the train is standing still or running at a low speed. This is an important feature, since it reduces materially the service which the battery is called upon to perform, and largely avoids the losses which would otherwise be sustained by the transformation of energy in the batteries themselves.

It is to be understood that the features constituting the present invention are not limited to use with the prior devices aforesaid, but may be employed in any system to which they may be applicable.

Referring to Fig. 1 of the accompanying drawings, A represents a railway car with the axle $w$ of the wheel W belted to the dynamo B by the belt $b$. The dynamo is suspended beneath the car on a single bearing C, upon which it is free to swing longitudinally. The belt may be tightened by means of a rod D extending from the lower side of the dynamo through a bracket $d$ and retained by a spring $d'$ against the tension of the belt. Any other suitable form of suspension and driving gear may be employed. E is a storage battery and G is a set of lamps connected in multiple with one another along the interior of the car and provided with a switch $g$, by which they may be turned on or off. The dynamo is of the shunt type, having but a single field magnet coil contained in a shunt circuit, which comprises also an adjustable resistance or rheostat to be hereinafter described. From the armature of the dynamo extend the two main line wires F and $k^4$. From the line F the field magnet circuit branches off, and after passing through the coil of the said magnet it goes to the regulating rheostat and thence to the opposite or negative line $k^4$. From the same line F a branch leads to one of the storage battery terminals marked $+$ and from the opposite terminal the line H leads to the series coils of the main line switch, which will be hereinafter described, and thence to the contact $k^3$ of the switch and back to the opposite line $k^4$. Another branch of the line F leads to the lamps G and returns thence by the switch $g$ to the wire H already mentioned. It is thus manifest that the main line switch above mentioned controls the connection of the armature circuit of the dynamo with both the lamps and the battery, and also that the field magnet circuit aforesaid is connected to the main line upon the dynamo side of the said switch, so as to be energized whenever the dynamo is running, whether the lamps and battery are connected to the dynamo or not.

I will next describe the dynamo regulator and the main line switch, referring for the construction thereof to Figs. 2, 3, 4, and 5, and for the diagram of circuits thereof to Fig. 6.

The potential or shunt magnet, which serves as the determining factor of regulation, is lettered L. Its function is to receive the pressure or potential of the main line, and when such pressure departs from the normal value to set in operation agencies which will correct such departure and restore the pressure to the normal point. It thus maintains the pressure at the desired standard regardless of changes in speed and variations in current volume. The standard, however, toward which the magnet works, is adjusted from time to time to meet the conditions of the storage battery as regards the degree to which it is charged. The core of the magnet hangs horizontally so that the movable contact operated thereby may play between the two fixed contacts substantially free from the effect of gravity on the core, and the need of a spring for counterbalancing such effect.

The magnet L is of the solenoid form and its core $l'$ is joined to the lower end of the lever-arm $l$ of the director or pole-changer M of the rheostat motor P, so that it may close the circuit through the motor armature in one direction or the other whenever the core is drawn to one side or the other of its normal position shown in Figs. 2 and 6. The magnet acts against the force of the retractile spring 10 attached to the adjusting screw 11. The magnet is wound with the shunt coil $l^3$ (Fig. 6) and with the series coil $l^2$. The circuit of this shunt coil may be traced in Fig. 6 from the + terminal of the dynamo by the wire $f$, thence through the coil to the wire $u$ and to the wire $k^3$, which as appears in Fig. 1 is connected with the opposite terminal of the dynamo by the wire $k^4$. The series coil of the magnet may be traced in like manner from the positive terminal of the dynamo by the wire F, thence through the storage battery to the wire H (see Fig. 1) to the wire H', through the coil, and thence by the wire 14 through the series coils of the main line switch, which will be described hereafter, to contact $k$ of the said switch and thence—when the switch is closed, to the contact $k^2$, and by the wire $k^3$ to the opposite dynamo terminal. It is thus apparent that the series coil $l^2$ does not carry the current which goes to the lamps but only that which goes to the battery. It is wound so as to coöperate with the shunt coil $l^3$, and its function is to adjust the action of the shunt coil in accordance with the amount of current flowing into the battery at any given moment, which current is, of course, dependent upon the degree to which the battery is charged. If, for example, the battery is nearly discharged, a heavy current will tend to flow into it from the generator. This will strengthen the magnet L, or, in other words, will cause it to respond to a lower standard of line potential and to maintain by virtue of its regulating function, such lower potential, which in turn will serve to avoid an excessive flow of current into the battery so long as it is in that condition. On the other hand, when the battery is fully charged, or nearly so, little or no current will flow through the coil $l^2$, and the magnet L will then respond to a higher value of line potential. By this means the rate at which the storage battery is charged may be adjusted without seriously affecting the standard potential applied by the dynamo to the lamps. The magnet L is preferably cased in iron as at 16, Fig. 5, which reduces the reluctance of the magnetic circuit and strengthens the magnet. The series coil is wound in a single layer of only a few turns of flat wire as shown.

The director or pole-changer operated by the magnet L comprises a movable contact arm $R^2$, provided at its respective ends with insulated carbon contact buttons connected to the respective terminals of the armature of the motor P. Thus the carbon at one end of the said arm is connected by the wire $q^2$ with the commutator brush $q^5$, and the carbon at the opposite end of the arm is connected by the wire $q^3$ to the brush $q^4$. Adjacent to the contact arm $R^2$ are the parallel stationary arms R and $R^1$, the former being connected by the wire $f''$ to the field magnet $f'$ of the motor P, and thence by the wire $f$ to the + terminal of the storage battery, and the latter being connected by the wire $r$ with the wire $H'$, which is connected by the wire H with the opposite battery terminal. Thus—assuming the contacts $r'$, $r^2$ (Fig. 7) to be closed—the director will, when moved from its normal position, close the circuit of the motor P upon the storage battery, the current passing through the armature of the motor in one direction or the other according to the direction of movement of the arm $R^2$. This permits the motor to be worked by the battery in the event of the dynamo being disconnected from the main line by the main line switch K. Of course when the switch K is closed the motor will be worked from the dynamo or the battery indifferently. In the event of any sudden stoppage of the dynamo the motor will continue to operate and run the rheostat back to the starting point ready for the next starting of the dynamo.

In connection with the feature just mentioned I avoid the permanent closure of the motor circuit upon the battery by the following means: In the motor circuit between the arm $R^1$ and the line $r$ there are two contacts—$r^1$ and $r^2$, (Figs. 6 and 7), the latter being stationary and the former being mounted on the extremity of a short lever V, which is normally pressed upward by spring $v^1$. The lever V is also pressed upward so as to bring the contacts together by the arm X under the influence of a strong torsion spring X'. The arm X is, however, depressed by the rheostat arm N' (Figs. 2, 3 and 4), when in the course of its rotation back to the zero condition a projection thereon $x^2$ comes in contact with the hinged block $x'$ (Fig. 7), and forces it down so that it turns the arm X against the force of the torsion spring X' by means of the projection $x$. The lever V has also projecting from it a lug $v$, which stands in the path of the lever arm $l$, which is operated by the spring 10 against the force of the magnet L. When, therefore, the magnet L is deënergized, the spring 10 will force the lever arm $l$ against the lug $v$ and thereby press down the lever V against the force of the spring $v'$ and separate the contacts $r'$ and $r^2$ to break the motor circuit, provided this action is permitted by the arm X, but the arm X only permits it when the rheostat comes to its zero position and operates the arm X in the manner already described. Thus the motor circuit will remain closed even after the dynamo ceases to act, the magnet L being thereby deënergized, until the motor P returns the rheostat to the starting position with the minimum resistance in the field magnet circuit. When the dynamo again comes into action, the magnet L will again be energized and draw its core and the connected lever arm $l$ into its normal position, thereby releasing the lever V and allowing it to close the motor circuit.

To prevent the racing and hunting of the motor P, I provide upon its shaft a collar Q, to which are hinged the weighted governor arms Q'. These normally rest with a rubbing contact upon two stationary conducting disks $q$ and $q'$, interposed in the circuit of the wire $q^2$, and thereby connecting them electrically to close the armature circuit of the motor. When, however, the motor speed becomes too great, the governor arms break contact with the disks and open the motor circuit. By this means the racing of the motor is prevented and its tendency to hunt and thereby keep the rheostat in constant vibration is avoided. The details of the governor are shown clearly in Fig. 8. As shown in Figs. 1 and 12 the rheostat O is included in the shunt circuit of the field magnet passing from the positive wire F of the dynamo to the field magnet coil, thence through the resistance by the wires Z′ leading to the contact plate $n^4$, thence through the resistance to the rheostat arm N′, connected by the wire $Z_i$ to the wire $k^3$ on the dynamo side of the switch K.

Turning next to the main line switch K, it is composed of two arms pivoted one with respect to the other, as shown in Fig. 2, one arm being stationary, the other movable as appears in Fig. 11. They are normally held at an angle to each other by the spring $s$, acting upon projecting arms S′ on the respective magnets. The energizing of the magnets tends to draw them together into a parallel position, the poles S attracting the opposite poles $S^2$. This throws the switch blade T against the contacts $k$ and $k^2$, connected respectively to the dynamo on the one hand and the battery and lamps on the other. Preferably, as appears in Fig. 9, the blade T is provided with spring brushes $t$ bent to a V form and adapted to be received by similarly shaped openings between the two spring arms which constitute the respective contacts $k$ and $k^2$. The gripping tension of these spring arms upon the brushes $t$ may be regulated by the springs $t^2$. Each of these magnets is wound, as indicated in Fig. 6, with a shunt coil $K^2$ and a series coil $K^1$. The former is connected across the circuit on the dynamo side of the switch between the wire $f$ and the wire $k^3$. The latter is connected by the wire 14 in series with the coil $l^2$ of the magnet L so as to receive the battery current. The function of the shunt coil is to energize the magnet and thereby close the switch at a pre-determined potential. The function of the latter is to deënergize the magnets and open the switch in the event of the battery sending a reversed current through the dynamo. So long as the current flows from the dynamo into the battery the series coil K′ only serves to hold the switch more tightly in its closed position, and even when the battery is fully charged and its potential just equal to that of the dynamo, the switch will still remain closed by the action of the shunt coil alone and can only be opened by a positive reversal of the battery current. By this means the closing of the switch is not dependent immediately upon the speed of the dynamo, which may or may not bring the machine into a condition to have the switch closed, since the excitation of the field magnet requires an appreciable time and might not be accomplished even though the speed has reached a point at which the excitation would be ultimately sufficient. I therefore make it certain that the proper potential is reached before the switch is closed by making its closure dependent upon the shunt coil $K^2$. On the other hand, the switch is held closed even after the battery is fully charged, in order to prevent unnecessary operations of the switch, and no injury will result so long as the potentials of the battery and dynamo are equal.

I have shown in Figs. 10 and 11 two different arrangements of the mechanical form of this main switch, in both of which the coils are wound upon but one of the two parts. In Fig. 10 the coils are wound from the core 12, while the part 10 serves simply as an armature to be operated in one direction by the spring 13 attached to the end of the lever arm 14 and adjusted by the screw 15, the back stop being formed by the screw 16.

In Fig. 11 the arrangement is similar to that in Fig. 10 except that the movable one of the two parts is pivoted upon a vertical axis, and their pole pieces overlap so as to be brought face to face when the magnet is energized.

In Fig. 12 I have shown my device for differentiating the potential of the dynamo upon the lamps from its potential upon the battery. For this purpose a resistance 22 is interposed between the two main lines leading from the dynamo in series with the lamps G. The battery E however is connected to the same line in multiple with the lamps G but without the interposition of a resistance. Therefore, if the dynamo, for example, is regulated for a potential of seventy volts, it will deliver seventy volts to the battery but only sixty volts to the lamp, assuming that the resistance 22 occasions a drop of ten volts. I have provided, however, for automatically short-circuiting this resistance 22 when the main switch is opened to disconnect the dynamo, and for automatically breaking such short circuit when the main switch is again closed to connect the dynamo. In this manner the battery may be charged with a higher voltage such as may be necessary to overcome its internal resistance, and send the charging current through it, without altering the normal potential applied to the lamps. When, however, the battery so charged is connected with the lamp, the dynamo being disconnected therefrom, it will discharge upon the lamps at the normal voltage of sixty. The automatic short-circuiting device consists of a switch-blade 19 engaging with contacts 20 and 21, connected respectively to the opposite terminals of the resistance 22. The blade 19 is mounted on the extremity of an arm 17, but insulated therefrom by the section 24. The arm 17 is pivoted at the point 18 to the switch K and is also acted upon by the coil spring 23. By this arrangement the blade is held in its short-circuiting position by the spring 22 so long as the main switch is open. When, however, the main switch is closed, it withdraws the blade 19 from its contacts and opens the short circuit to throw the resistance 22 in series with the lamps G, as already described.

The lamp 15, Fig. 6, is to be placed in the circuit at the regulator to facilitate the inspection thereof.

I do not limit myself to the precise form assumed by the several features of my invention in the foregoing description and illustration, it being understood that the spirit of my invention may be embodied in many different ways by persons familiar with the electrical art.

In some of the following claims the regulation for constant potential is described as independent of the armature current, which means that while the current may vary widely in amount, dependent on the demands of the storage battery and the lamps, yet the potential remains practically constant, although the standard of potential may be automatically adjusted from time to time, as already described, to meet the pressure requirements of the battery.

I do not claim herein the means for charging a storage battery from a variable speed dynamo potentially regulated, except as they are employed in connection with a system in which the electric lamps are operated from the same dynamo in multiple with the battery. The said means are claimed broadly in a divisional application No. 232,774, dated Nov. 15, 1904.

What I claim as new and desire to secure by Letters Patent is:

1. The combination in an electric lighting system of electric lamps and a storage battery, a dynamo driven at a variable speed and regulated for constant potential and means for adjusting, according to the varying conditions of the storage battery, the standard to which the potential is regulated.

2. The combination in an electric lighting system of electric lamps and a storage battery, operated in multiple on a constant potential circuit, a dynamo connected to the said circuit and regulated for constant potential, and means for adjusting, according to the varying conditions of the storage battery, the standard to which the potential is regulated.

3. The combination in an electric lighting system of electric lamps and a storage battery connected in multiple to a constant potential circuit, a variable speed dynamo connected to the said circuit, a regulator for maintaining constant the potential of the said dynamo, and means for adjusting, according to the amount of current flowing in the branch circuit leading to the storage battery, the standard to which the potential is regulated.

4. The combination in an electric lighting system of electric lamps and a storage battery, connected in multiple to a constant potential circuit, a dynamo supplying the said circuit, a regulator therefor controlled by a potential magnet and means for adjusting the point of action of said magnet according to the conditions of the storage battery.

5. The combination in an electric lighting system of electric lamps and a storage battery, connected to a constant potential circuit, a dynamo supplying the said circuit, a potential magnet connected to the said circuit for determining the regulation of the dynamo and an adjusting coil contained in the branch circuit leading to the storage battery.

6. The combination in an electric lighting system of electric lamps and a storage battery, connected in multiple to a constant potential circuit, a dynamo supplying the said circuit, a rheostat for adjusting the excitations of the dynamo, a potential magnet controlling the said rheostat and an adjusting coil contained in the branch circuit leading to the storage battery.

7. The combination in an electric lighting system of electric lamps and a storage battery, connected in multiple to a constant potential circuit, a dynamo supplying the said circuit, a shunt circuit containing the field magnet of the dynamo, a rheostat in said field magnet circuit, a motor for operating the rheostat, a potential coil controlling the said motor and an adjusting coil contained in the branch circuit leading to the storage battery.

8. The combination in an electric lighting system of electric lamps and a storage battery, connected to a constant potential circuit, a dynamo supplying the said circuit, a potential magnet controlling the regulation of the said dynamo and an adjusting coil wound upon the said magnet and contained in the branch circuit leading to the storage battery.

9. The combination in an electric lighting system of electric lamps and a storage battery connected in multiple to a constant potential circuit, a dynamo supplying the said circuit, a main switch contained in the said circuit between the dynamo and the battery, having its closure dependent upon the potential of the system and its opening dependent upon the relative potentials of the dynamo and the battery, a potential coil on the dynamo side of the said switch for determining the regulation of the dynamo and an adjusting coil on the battery side of the said switch contained in the branch circuit leading to the said battery.

10. The combination in an electric lighting system of electric lamps and a storage battery connected to a constant potential system, a variable speed dynamo supplying the said circuit, a main line switch, a potential coil for closing the said switch, a series coil for opening the said switch, a regulating rheostat for the dynamo, a motor for the said rheostat, a potential coil controlling the said motor, and means for adjusting the point of action of the said coil in accordance with the conditions of the storage battery.

11. The combination in an electric lighting system of a storage battery, a variable speed dynamo, a regulator for the said dynamo, a motor for the said regulator operated from the storage battery and a potential magnet controlling the said motor.

12. The combination in an electric lighting system of electric lamps and a storage battery connected to a constant potential circuit, a variable speed dynamo supplying the said circuit, a regulator for the dynamo, a switch between the dynamo and the storage battery, a motor for operating the said regulator connected to the circuit on the battery side of the said switch so as to be operated by the battery, and a potential magnet controlling the said motor.

13. The combination in an electric lighting system of electric lamps and a storage battery connected to a constant potential circuit, a variable speed dynamo supplying the said circuit, a regulator for the dynamo, a motor for the said regulator operated by the storage battery, a potential magnet controlling the said motor and an automatic circuit breaker in the motor circuit.

14. The combination in an electric lighting system of a storage battery on a constant potential circuit, a variable speed dynamo supplying the said circuit, a regulator for the said dynamo, a motor for the said regulator operated by the storage battery and an automatic circuit breaker for disconnecting the motor from the battery at a predetermined point.

15. The combination in an electric lighting system of a storage battery on a constant potential circuit, a dynamo supplying the said circuit, a switch between the dynamo and the battery, a regulating motor for the dynamo connected to the circuit on the battery side of the said switch, and an automatic circuit breaker for disconnecting the motor from the battery at a predetermined point.

16. The combination in an electric lighting system of a storage battery on a constant potential circuit, a dynamo supplying the said circuit, a switch between the dynamo and the battery, a regulator motor connected to the circuit on the battery side of said switch, a second switch in the motor circuit, a potential magnet connected to the main circuit on the dynamo side of the main switch for closing the said second switch and a connection between said second switch and the motor for opening the switch at a predetermined point.

17. The combination in an electric lighting system of a storage battery on a constant potential circuit, a variable speed dynamo supplying the said circuit, a regulator for the dynamo, a motor for the regulator connected to the storage battery, a potential magnet controlling the said motor and a switch in the motor circuit closed by the said potential magnet and opened by the motor.

18. The combination in an electric lighting system of a constant potential circuit, a variable speed dynamo, a switch for connecting the dynamo to said circuit, a potential magnet on the dynamo side of the said switch for closing the switch, a series coil for opening the switch, a regulator for the dynamo, a motor for said regulator, a centrifugal device controlling the said motor and a potential magnet also controlling the said motor and connected to the circuit on the dynamo side of the said switch.

19. The combination in an electric lighting system of a constant potential circuit, a variable speed dynamo, a switch for connecting the dynamo to the said circuit, a potential magnet controlling the said switch connected to the circuit on the dynamo side of the switch, a regulator motor for the dynamo, a shunt circuit containing the said motor, a circuit breaker in the said circuit and a governor therefor controlled by the speed of the motor.

20. The combination in an electric lighting system of electric lamps and a storage battery on a constant potential circuit, a variable speed dynamo, a switch for connecting the dynamo to the said circuit, a potential coil on the dynamo side of the said switch for closing the switch, a series coil for opening the switch, a rheostat for the field magnet circuit of the dynamo, a motor for operating the said rheostat, a speed governor for the motor and a potential magnet connected to the circuit on the dynamo side of the switch for controlling the said motor.

21. The combination in an electric lighting system, of a constant potential circuit, electric lamps and a storage battery thereon, means for modifying the standard of potential according to the storage-battery conditions, a variable speed dynamo having its excitation dependent upon the potential, a circuit-closing switch between the dynamo and the said circuit, a shunt magnet operating the said switch directly and permanently connected to the circuit of the dynamo side of the switch, and a series coil on the battery side of the said switch for opening the switch.

22. The combination in an electric lighting system of a constant potential circuit, electric lamps and a storage battery thereon, a variable speed dynamo, a rheostat for regulating the field magnet strength of the dynamo, a motor connected to the storage battery for operating the rheostat, a potential magnet controlling the said motor, an automatic circuit breaker in the motor circuit, a switch between the dynamo and the said circuit, a shunt coil for closing the said switch connected to the circuit on the dynamo side of the switch and a series coil for opening the switch connected to the battery on the battery side of the said switch.

23. The combination in an electric lighting system for railway vehicles of a variable speed dynamo, a regulator therefor and a potential magnet controlling the said regulator by means of movable and stationary contacts and having its core suspended horizontally so as to be independent of gravity in its relation to the surrounding coil.

24. The combination in an electric lighting system for railway vehicles of a variable speed dynamo, a regulator motor, a circuit closer for the motor comprising movable and fixed contacts and a potential magnet operating said circuit-closer and having a horizontally suspended core.

25. In an electric lighting system, the combination with a variable speed dynamo of a regulator therefor, a motor for the regulator, a magnet controlling the motor and a speed limiting device for the motor.

26. In an electric lighting system, the combination with a variable speed dynamo, of a rheostat in the field magnet circuit, an electric motor operating the rheostat, a regulating magnet controlling the motor and an arrester for the motor responding to the motor speed.

27. In an electric lighting system the combination with a variable speed dynamo of electric lamps and a storage battery, a switch for connecting the dynamo to the line, a regulator for the dynamo, a motor for the regulator operated by the storage battery and an automatic circuit controller for the motor connected to the regulator so as to be operated thereby as the regulator comes to its off position.

Signed by me at Albany, New York, this 8th day of July, 1899.

JAMES F. McELROY.

Witnesses:
  W. S. MORRISON,
  CHAS. B. MITCHELL.